United States Patent
Cho et al.

(10) Patent No.: US 9,657,178 B2
(45) Date of Patent: May 23, 2017

(54) ANTI-REFLECTIVE COATING COMPOSITION COMPRISING SILOXANE COMPOUND, AND ANTI-REFLECTIVE FILM USING SAME

(71) Applicant: LG Hausys, Ltd., Seoul (KR)

(72) Inventors: Hong Kwan Cho, Anyang-si (KR); Joo Hee Hong, Uiwang-si (KR); Won Kook Kim, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 198 days.

(21) Appl. No.: 14/418,774

(22) PCT Filed: Dec. 27, 2012

(86) PCT No.: PCT/KR2012/011578
§ 371 (c)(1),
(2) Date: Jan. 30, 2015

(87) PCT Pub. No.: WO2014/038760
PCT Pub. Date: Mar. 13, 2014

(65) Prior Publication Data
US 2015/0175809 A1 Jun. 25, 2015

(30) Foreign Application Priority Data
Sep. 4, 2012 (KR) .................. 10-2012-0097659

(51) Int. Cl.
| | | |
|---|---|---|
| *C09D 183/02* | (2006.01) | |
| *C09D 5/00* | (2006.01) | |
| *C08J 5/18* | (2006.01) | |
| *G02B 1/11* | (2015.01) | |
| *C09D 183/04* | (2006.01) | |
| *G02B 1/111* | (2015.01) | |
| *C08J 7/04* | (2006.01) | |
| *C09D 183/06* | (2006.01) | |
| *C08K 7/26* | (2006.01) | |
| *C08G 77/24* | (2006.01) | |

(52) U.S. Cl.
CPC ............ *C09D 5/006* (2013.01); *C08J 5/18* (2013.01); *C08J 7/047* (2013.01); *C09D 183/02* (2013.01); *C09D 183/04* (2013.01); *C09D 183/06* (2013.01); *G02B 1/11* (2013.01); *G02B 1/111* (2013.01); *C08G 77/24* (2013.01); *C08J 2367/02* (2013.01); *C08J 2483/02* (2013.01); *C08J 2483/04* (2013.01); *C08K 7/26* (2013.01)

(58) Field of Classification Search
None
See application file for complete search history.

(56) References Cited

U.S. PATENT DOCUMENTS

| | | | | |
|---|---|---|---|---|
| 5,880,227 | A * | 3/1999 | Kobayashi | C09D 183/04 525/102 |
| 6,572,973 | B1 * | 6/2003 | Taruishi | B32B 27/08 428/428 |
| 7,695,781 | B2 * | 4/2010 | Yoneyama | G02B 1/111 349/137 |
| 8,492,450 | B2 * | 7/2013 | Araki | C08F 290/148 522/1 |
| 2003/0087102 | A1 * | 5/2003 | Yamaya | C08J 7/045 428/419 |
| 2005/0109238 | A1 * | 5/2005 | Yamaki | B32B 7/02 106/287.16 |
| 2007/0196667 | A1 * | 8/2007 | Asai | C08J 7/047 428/421 |
| 2007/0243394 | A1 * | 10/2007 | Yamaya | C09D 183/08 428/447 |
| 2007/0266896 | A1 * | 11/2007 | Suwa | C09D 5/006 106/287.16 |
| 2009/0214796 | A1 * | 8/2009 | Okaniwa | G02B 1/113 427/444 |

(Continued)

FOREIGN PATENT DOCUMENTS

| | | |
|---|---|---|
| CN | 1969023 A | 5/2007 |
| EP | 1447433 A1 | 8/2004 |
| JP | 0546482 B2 | 7/1993 |

(Continued)

OTHER PUBLICATIONS

Chinese Office Action issued on Apr. 19, 2016 corresponding to Chinese Application No. 201280075562.1 citing the above reference(s).
International Search Report for PCT/KR2012/011578 mailed on May 31, 2013, citing the above reference(s).
Notice of Allowance dated May 20, 2015 from the Korean Intellectual Property Office in connection with the counterpart Korean patent application No. 10-2012-0097659, citing the above reference(s).

(Continued)

*Primary Examiner* — Robert S Loewe
(74) *Attorney, Agent, or Firm* — Hauptman Ham, LLP

(57) ABSTRACT

The present invention relates to an anti-reflective coating composition, to an anti-reflective film using the same, and to a method for manufacturing the anti-reflective film, wherein the anti-reflective coating composition can form a coating layer having a low refractive index. More particularly, the present invention relates to an anti-reflective film and to a method for manufacturing same, wherein the reflectance of the anti-reflective film is minimized by using an anti-reflective coating composition comprising a siloxane compound prepared by reacting organosilane, which has a fluoroalkyl group and alkoxy silane, as a binder to form a coating layer. The anti-reflective film using the anti-reflective coating composition has excellent anti-reflective effects. Thus, it is expected that the present invention can be applied to various display devices such as those which include touch films.

16 Claims, No Drawings

(56) References Cited

U.S. PATENT DOCUMENTS

2013/0071646 A1* 3/2013 Kim ...................... C09D 7/005
                                                                         428/323

FOREIGN PATENT DOCUMENTS

| | | | |
|---|---|---|---|
| JP | 2000233467 | A | 8/2000 |
| JP | 2001194505 | A | 7/2001 |
| JP | 2002200690 | A | 7/2002 |
| JP | 2007-038447 | A | 2/2007 |
| JP | 2007-182511 | A | 7/2007 |
| JP | 2007-316213 | A | 12/2007 |
| JP | 2010-085579 | A | 4/2010 |
| KR | 20040070225 | A | 8/2004 |
| KR | 1020060111622 | A | 10/2006 |
| KR | 1020070022311 | A | 2/2007 |
| KR | 1020090043397 | A | 5/2009 |
| KR | 1020090087285 | A | 8/2009 |
| TW | 302559 | B | 11/2008 |
| TW | 201235299 | A | 9/2012 |
| WO | 2005/121265 | A1 | 12/2005 |
| WO | WO 2011126303 A2 * | | 10/2011 ............. C09D 7/005 |

OTHER PUBLICATIONS

Japanese Office Action dated Sep. 27, 2016 in connection with the counterpart Japanese Patent Application No. 2015-529649, citing the above reference(s).

* cited by examiner

ANTI-REFLECTIVE COATING COMPOSITION COMPRISING SILOXANE COMPOUND, AND ANTI-REFLECTIVE FILM USING SAME

CROSS REFERENCE TO RELATED APPLICATION

This application claims the priority of Korean Patent Application No. 10-2012-0097659 filed on Sep. 4, 2012 in the Korean Patent and Trademark Office. Further, this application is the National Phase application of International Application No. PCT/KR2012/011578 filed on Dec. 27, 2012, which is incorporated herein by reference in its entirety.

TECHNICAL FIELD

The present invention relates to an anti-reflective coating composition capable of forming a coating layer having a low index of refraction, an anti-reflective film using the same, and a method for manufacturing the anti-reflective film. More particularly, the present invention relates to an anti-reflective film exhibiting minimized reflectance by forming a coating layer using an anti-reflective coating composition including a siloxane compound, which is prepared by reacting a fluoroalkyl group-containing organosilane with an alkoxysilane, as a binder, and to a method for manufacturing the anti-reflective film.

BACKGROUND ART

When a display is exposed to external light such as various illumination, natural light, and the like, an image formed by reflected light inside the display is not clearly focused on the eye to cause deterioration in contrast, and thus there is difficulty in viewing a screen, and eye fatigue and headaches are caused. For this reason, there is also extremely strong demand for anti-reflection.

In a substrate on which a single-layer anti-reflective film is formed, when an index of refraction of the substrate is defined as ns and an index of refraction of the single-layer anti-reflective film is defined as n, a minimum value of reflectance R of the anti-reflective film is represented by $(n_s-n^2)^2/(n_s+n^2)^2$. Since the minimum value of the reflectance R is obtained when $n^2=n_s$ is satisfied, the reflectance becomes lower, as the index of refraction n of the single-layer anti-reflective film becomes closer to $(n_s)^{1/2}$. Generally, considering an index of refraction $n_s$ of polyethylene terephthalate used as a substrate in transparent conductive films is about 1.54, it is desirable that the index of refraction n of the anti-reflective film be closer to a range from about 1.22 to about 1.24 as far as possible to reduce the reflectance R thereof.

Typically, the anti-reflective film includes an anti-reflective layer formed on a light transmitting base. For example, Japanese Patent Laid-open Publication No. 2002-200690 discloses an anti-reflective layer having a three-layer structure in which a hard coating layer, a 1 μm or less thick high index of refraction layer and a low index of refraction layer are stacked in order from a light transmitting base.

In addition, to simplify a manufacture process, Japanese Patent Laid-open Publication No. 2000-233467 discloses a two-layer structure in which a hard coating layer and a low index of refraction layer are stacked without a high index of refraction layer in the aforementioned anti-reflective film.

Due to development of hollow silica particles which have a low index of refraction, low index of refraction coating materials having an extremely low index of refraction have been studied. However, an index of refraction of the low index of refraction coating materials developed using an existing acrylic resin has not reached 1.22 to 1.24 corresponding to the theoretically optimum value for anti-reflection. Although various attempts have been made to solve this problem by addition of a fluorine-containing polymeric material to reduce an index of refraction, there is a problem of increase in surface energy of a coating surface. In addition, due to poor compatibility of the hollow silica particles with the acrylic resin, it is necessary to perform surface treatment of the silica particles allowing the silica particles to be bonded to the acrylic resin.

Korean Patent Laid-open Publication No. 2004-0070225 discloses a coating composition including a silica precursor obtained by hydrolysis and polycondensation of an alkoxysilane. However, since a method of condensation and thermal curing of a silane compound provides insufficient curing upon low-temperature and short-time thermal curing and thus requires high-temperature or long-time curing for sufficient curing density, the method has a number of problems such as increase in production cost, deterioration in productivity, damage to a plastic film base, crack generation in a hard coating layer due to shrinkage caused by heating, and the like.

In addition, although a technique for manufacturing a low index of refraction coating layer by introduction of a fluorine-containing alkoxysilane can also be suggested, there is a limit in application of the technique since there are problems such as phase separation and the like.

Therefore, there is a continuous need for development of a method in which a silica coating layer having a low index of refraction can be formed on a base without phase separation.

DISCLOSURE

Technical Problem

To solve the problems, inventors of the present invention have developed an anti-reflective film in which a silica coating layer having a low index of refraction is coated onto a base, and have found that when a coating liquid including a siloxane compound, which is prepared by reacting a fluoroalkyl group-containing organosilane with an alkoxysilane, is used as a binder, an anti-reflective film having a transmittance of 96% or more and a luminous reflectance of 1.0% or less can be manufactured by inclusion of a coating layer of a low index of refraction without phase separation, thereby completing the present invention.

Therefore, it is an aspect of the present invention to provide an anti-reflective film exhibiting minimized reflectance and improved light transmittance by forming an anti-reflective layer from a coating liquid including a specific siloxane compound binder, and to provide a method for manufacturing the anti-reflective film.

Technical Solution

In accordance with one aspect of the present invention, an anti-reflective coating composition includes: a binder formed by polymerization of a silane compound represented by Formula 1 and an organosilane compound represented by Formula 2; and hollow silica particles.

$$R^1{}_x Si(OR^2)_{4-x} \qquad \text{[Formula 1]}$$

wherein R' is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \leq x \leq 4$.

  [Formula 2]

wherein $R^3$ is a $C_1$ to $C_{12}$ fluoroalkyl group; $R^4$ is a $C_1$ to $C_6$ alkyl group; and y is an integer satisfying $0 \leq y \leq 4$.

In accordance with another aspect of the present invention, an anti-reflective film includes a low index of refraction layer formed by coating the coating composition as set forth above onto a surface of a base.

In accordance with a further aspect of the present invention, a method for manufacturing an anti-reflective film includes: preparing a binder by polymerization of a silane compound represented by Formula 1 and an organosilane compound represented by Formula 2; preparing a coating composition including surface-treated hollow silica particles by adding the binder and an acid catalyst to the hollow silica particles; coating the coating composition onto at least one surface of a base film; and performing heat treatment of the coated coating composition.

Advantageous Effects

When the anti-reflective coating composition according to the present invention is used, an coating layer which has a low index of refraction while solving a typical problem of phase separation can be formed.

Since the anti-reflective film using the anti-reflective coating composition exhibits excellent anti-reflection, the anti-reflective film is anticipated to be used as a touch film and the like in various displays.

BEST MODE

The above and other aspects, features, and advantages of the present invention will become apparent from the detailed description of the following embodiments. However, it should be understood that the present invention is not limited to the following embodiments and may be embodied in different ways, and that the embodiments are provided for complete disclosure and thorough understanding of the invention by those skilled in the art. The scope and sprit of the present invention should be defined only by the accompanying claims and equivalents thereof.

Hereinafter, an anti-reflective coating composition, an anti-reflective film and a method for manufacturing the anti-reflective film according to embodiments of the present invention will be described in detail.

Anti-reflective Coating Composition

In accordance with one aspect of the present invention, an anti-reflective coating composition includes: a binder formed by polymerization of a silane compound represented by Formula 1 and an organosilane compound represented by Formula 2; and hollow silica particles.

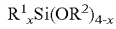  [Formula 1]

wherein $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \leq x \leq 4$.

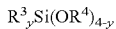  [Formula 2]

wherein $R^3$ is a $C_1$ to $C_{12}$ fluoroalkyl group; $R^4$ is a $C_1$ to $C_6$ alkyl group; and y is an integer satisfying $0 \leq y \leq 4$.

The silane compound represented by Formula 1 may be a tetrafunctional alkoxysilane having four alkoxy groups when x is 0, may be a trifunctional alkoxysilane having three alkoxy groups when x is 1, and may be a bifunctional alkoxysilane having two alkoxy groups when x is 2. Since the silane compound has only one alkoxy group corresponding to a functional group when x is 3, the silane compound is not suitable for condensation with the organosilane compound represented by Formula 2.

In Formula 1, the $C_6$ to $C_{10}$ aryl group may include a phenyl group or a tolyl group; and the $C_3$ to $C_{10}$ alkenyl group may include allyl group, 1-propenyl group, 1-butenyl, 2-butenyl, 3-butenyl groups, and the like.

The silane compound may include at least one compound selected from among tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane, allyltriethoxysilane, dimethyldimethoxysilane, dimethyldiethoxysilane, diphenyldimethoxysilane, and diphenyldiethoxysilane, without being limited thereto.

The organosilane compound represented by Formula 2 may include at least one compound selected from among trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, and heptadecafluorodecyltriethoxysilane, without being limited thereto. More preferably, $R^3$ is a $C_3$ to $C_5$ fluoroalkyl group since it does not cause phase separation.

The silane compound represented by Formula 1 and the organosilane compound represented by Formula 2 are subjected to hydrolysis, followed by dehydration condensation polymerization, thereby forming a siloxane compound. In hydrolysis and dehydration condensation, an acid catalyst, specifically nitric acid, hydrochloric acid, sulfuric acid or acetic acid may be used.

The organosilane compound represented by Formula 2 is present in an amount of 0.1 parts by weight to 50 parts by weight, preferably 1 part by weight to 30 parts by weight, more preferably 5 parts by weight to 20 parts by weight, based on 100 parts by weight of the silane compound represented by Formula 1. If the amount of the organosilane compound is less than 0.1 parts by weight, there is a problem of insignificant reduction in an index of refraction of the composition, and if the amount of the organosilane compound is greater than 50 parts by weight, there is a problem of increase in index of refraction of the composition.

The formed siloxane compound acts as an organic-inorganic hybrid binder and thus serves to treat a surface of the hollow silica particles.

The siloxane compound has a weight average molecular weight from 1,000 to 100,000, preferably from 2,000 to 50,000, more preferably from 5,000 to 20,000. If the weight average molecular weight is less than 1,000, it is difficult to form a coating layer having a low index of refraction, and if the weight average molecular weight is greater than 100,000, there is a problem of deterioration in light transmittance of the anti-reflective film.

The hollow silica particles refer to silica particles which are produced from a silicon compound or an organic silicon compound and have an empty space on a surface and/or an interior thereof.

The hollow silica particles may be included in the form of a colloid in which the silica particles are present in an amount of 5% by weight (wt %) to 40 wt % in terms of solid content while being dispersed in a dispersion medium (water or organic solvent). Here, organic solvents which can be used as the dispersion medium may include: alcohols such as methanol, isoproply alcohol (IPA), ethylene glycol, butanol, and the like; ketones such as methyl ethyl ketone, methyl isobutyl ketone (MIBK), and the like; aromatic hydrocarbons such as toluene, xylene, and the like; amides such as dimethylformamide, dimethylacetamide, N-methylpyrrolidone, and the like; esters such as ethyl acetate, butyl acetate, γ-butyrolactone, and the like; ethers such as tetrahydrofuran, 1,4-dioxane, and the like; and mixtures thereof. When the hollow silica particles are used in the form of a colloidal solution in which the silica particles are dispersed in the dispersion medium as described above, the amount of the hollow silica particles may be adjusted within the range as set forth above in consideration of solid content and the like.

In addition, the hollow silica particles have a number average diameter from 1 nm to 1,000 nm, preferably from 5 nm to 500 nm, more preferably from 10 nm to 100 nm Within this range, there is an advantage in that the anti-reflective film exhibits anti-reflection while maintaining transparency.

The siloxane compound binder is present in an amount of 10 parts by weight to 120 parts by weight, preferably 20 parts by weight to 100 parts by weight, more preferably 40 parts by weight to 80 parts by weight, based on 100 parts by weight of the hollow silica particles. If the amount of the binder is less than 10 parts by weight, there is a problem in that a coating surface suffers from whitening, and if the amount of the binder is greater than 120 parts by weight, there is a problem of significant reduction in anti-reflection.

The anti-reflective coating composition may include an acid catalyst to promote surface treatment of the hollow silica particles by the binder, and the acid catalyst may include any acid catalyst generally used in the art. Preferably, the acid catalyst is nitric acid or hydrochloric acid. The acid catalyst may be present in an amount of 0.1 parts by weight to 20 parts by weight based on 100 parts by weight of the hollow silica particles. It is advantageous that the coating composition is adjusted to a pH in the range of 2 to 4 using the acid catalyst.

Anti-Reflective Film

In accordance with another aspect of the present invention, an anti-reflective film includes a low index of refraction layer formed by coating the coating composition as set forth above onto a surface of a base.

The base may include various substrates, such as transparent polymeric resins and the like, used in typical liquid crystal displays and the like. Specifically, the base may include polyethylene terephthalate (PET), polyethylene naphthalate (PEN), polyethersulfone (PES), polycarbonate (PC), polypropylene (PP), norbornene resins, and the like.

When a material of the base is PET, a PET film has a thickness of about 10 μm to about 200 μm, preferably from about 20 μm to about 100 μm. If the thickness of the transparent base is less than about 10 μm, there is a problem in mechanical strength of the base, and if the thickness of the transparent base is greater than about 200 μm, there can be a case in which touch properties of anti-reflective film used for touch panels are not improved.

The low index of refraction layer formed of the anti-reflective coating composition has an index of refraction from 1.20 to 1.25.

In addition, the low index of refraction layer has a thickness of 1 nm to 1,000 nm, preferably from 10 nm to 500 nm. If the thickness is less than 1 nm, there is a problem of insignificant anti-reflection of the anti-reflective film, and if the thickness is greater than 1,000 nm, there is a problem of deterioration in adhesion of the low index of refraction layer.

According to the present invention, the anti-reflective film has a transmittance of 96% or more and a luminous reflectance from 0.5% to 1.0%, and thus can exhibit excellent anti-reflection.

Method for Manufacturing Anti-Reflective Film

In accordance with a further aspect of the present invention, a method for manufacturing an anti-reflective film includes: preparing a binder by polymerization of a silane compound represented by Formula 1 and an organosilane compound represented by Formula 2; preparing a coating composition including surface-treated hollow silica particles by adding the binder and an acid catalyst to the hollow silica particles; coating the coating composition onto at least one surface of a base film; and performing heat treatment of the coated coating composition.

If the silane compound represented by Formula 1 and the organosilane compound represented by Formula 2 are mixed in a solvent in the presence of an acid catalyst, the binder can be prepared as a siloxane compound through dehydration and polymerization.

The prepared binder is mixed with the hollow silica particles in the solvent in the presence of the acid catalyst, and thereby applied to surface treatment of the hollow silica particles. The binder and the hollow silica particles are mixed at 20° C. to 40° C. for about 5 hours to 50 hours, preferably for 10 hours to 40 hours, more preferably for 20 hours to 30 hours while stirred.

As described above, the coating composition may include 10 parts by weight to 120 parts by weight of the binder and 0.1 parts by weight to 20 parts by weight of the acid catalyst, based on 100 parts by weight of the hollow silica particles.

The coating composition obtained by mixing as set forth above is coated onto the at least one surface of the base film. Coating may be performed using one method selected from among gravure coating, slot die coating, spin coating, spray coating, bar coating, and dip coating, without being limited thereto.

The coating composition is coated to a thickness of 1 nm to 1,000 nm onto the one surface of the base film, followed by heat treatment at 50° C. to 200° C., thereby forming an anti-reflective layer. More specifically, the solvent is removed from the coating composition by drying at a high temperature of 100° C. to 200° C. for about 1 minute to about 10 minutes, followed by aging at 50° C. to 200° C. for about 10 hours to about 100 hours, thereby forming the anti-reflective layer.

Hereinafter, the anti-reflective film according to the present invention will be described in more detail with reference to some examples.

It should be understood that the following examples are provided for illustration only and are not to be construed in any way as limiting the present invention.

EXAMPLE 1

1. Preparation of Siloxane Compound Binder 100 parts by weight of water, 433 parts by weight of isopropanol and 36 parts by weight of 0.1 M $HNO_3$ were placed in a reactor, followed by stirring for 10 minutes. Next, 372 parts by weight of tetraethoxysilane (tetraethyl orthosilicate, TEOS) and 29 parts by weight of (3,3,3-trifluoropropyl)triethoxysilane were slowly introduced into the reactor through a funnel for 30 minutes. Next, the components were stirred at 50° C. for 2 hours, followed by cooling to room temperature, and then stirred again at a stirring speed of 200 rpm for 24 hours, thereby obtaining a transparent binder solution. It was confirmed that the solution had a solid content of 13 wt % and a pH of 2.2. The transparent solution was used in the preparation of a coating composition in the next stage without a separate purification process.

2. Preparation of Anti-Reflective Coating Composition 65 parts by weight of the prepared binder solution, 100 parts by weight of isopropanol and 65 parts by weight of a dispersion sol (Thrylya 4110, JGC C&C Co., Ltd., 20% w/w), which was prepared by dispersing hollow silica particles having a umber average diameter of 60 nm in isopropanol, were placed in a reactor, followed by stirring at room temperature for 24 hours, thereby preparing an anti-reflective coating composition. It was confirmed that the anti-reflective coating composition had a solid content of 10 wt % and a pH of 2.5.

3. Manufacture of Anti-Reflective Film

The prepared anti-reflective coating composition was coated to a thickness of 100 nm onto a 20 μm thick PET film using a Mayer bar, followed by drying at 130° C. for 2 minutes, thereby forming an coating layer. Next, the coating layer was subjected to aging in an oven at 60° C. for 24 hours, thereby manufacturing a final anti-reflective film.

EXAMPLE 2

An anti-reflective coating composition and an anti-reflective film were prepared in the same manner as in Example 1 except that 100 parts by weight of water, 700 parts by weight of isopropanol, 50 parts by weight of 0.1 M $HNO_3$, 350 parts by weight of tetraethoxysilane (tetraethyl orthosilicate, TEOS) and 100 parts by weight of (3,3,3-trifluoropropyl)triethoxysilane were used.

EXAMPLE 3

An anti-reflective coating composition and an anti-reflective film were prepared in the same manner as in Example 1 except that 100 parts by weight of water, 700 parts by weight of isopropanol, 50 parts by weight of 0.1 M $HNO_3$, 350 parts by weight of tetraethoxysilane (tetraethyl orthosilicate, TEOS) and 100 parts by weight of nonafluorohexyltriethoxysilane were used.

COMPARATIVE EXAMPLE

An anti-reflective coating composition and an anti-reflective film were prepared in the same manner as in Example 1 except that a binder was prepared by condensation polymerization of only tetraethoxysilane without (3,3,3-trifluoropropyl)triethoxysilane.

EVALUATION

1. Molecular Weight of Binder

A weight average molecular weight of each of the binders polymerized in Examples and Comparative Example was measured using an E2695 GPC apparatus (Water Co., Ltd.). Results are shown in Table 1.

TABLE 1

| | Weight average molecular weight |
|---|---|
| Example 1 | 12,000 |
| Example 2 | 14,000 |
| Example 3 | 18,000 |
| Comparative Example | 8,000 |

2. Index of Refraction

An index of refraction of the coating layer of each of the prepared anti-reflective films was measured at wavelengths of 532 nm, 632.8 nm and 830 nm using a prism coupler, and an index of refraction at 550 nm was calculated using the Cauchy dispersion formula. Results are shown in Table 2.

TABLE 2

| | Index of refraction |
|---|---|
| Example 1 | 1.23 |
| Example 2 | 1.23 |
| Example 3 | 1.24 |
| Comparative Example | 1.26 |

As shown in Table 2, it was confirmed that the coating layers of Examples could realize an index of refraction of 1.23 corresponding to a theoretically optimum value when the PET base was used.

3. Transmittance and Minimum Reflectance

A transmittance of each of the manufactured anti-reflective films was measured using a CM-5 spectrophotometer (Konica Minolta Co., Ltd.). In addition, a back surface of each of the anti-reflective films was subjected to blackening treatment, followed by measurement of luminous reflectance and minimum reflectance. Results are shown in Table 3.

TABLE 3

| | Transmittance (D65) (%) | Luminous reflectance (D65) (%) | Minimum reflectance (%) |
|---|---|---|---|
| Example 1 | 96.2 | 0.7 | 0.6 |
| Example 2 | 96.1 | 0.7 | 0.6 |
| Example 3 | 96.0 | 0.9 | 0.7 |
| Comparative Example | 95.1 | 1.1 | 1.0 |

As shown in Table 3, it was confirmed that, since the anti-reflective films of Examples had a transmittance of 96% or more, a luminous reflectance from 0.7% to 0.8% and a minimum reflectance from 0.6% to 0.7%, the anti-reflective films of Examples exhibit excellent anti-reflection.

Although the present invention has been described with reference to some embodiments, it should be understood that the embodiments are provided for illustration only, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. An anti-reflective coating composition comprising:
a binder formed by polymerization of a silane compound represented by Formula 1 and an organosilane compound represented by Formula 2,
wherein the organosilane compound represented by Formula 2 is present in an amount of 1 part by weight to 30 parts by weight, based on 100 parts by weight of the silane compound represented by Formula 1, and
wherein the binder has a weight average molecular weight from 12,000 to 18,000;
hollow silica particles; and
an acid catalyst configured to promote a surface treatment of the hollow silica by the binder,
wherein the acid catalyst is present in an amount of 0.1 part by weight to 20 parts by weight based on 100 parts by weight of the hollow silica particles,
wherein the coating composition has a pH in the range of 2 to 4

$$R^1_x Si(OR^2)_{4-x} \quad \text{[Formula 1]}$$

wherein $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \leq x \leq 3$ $$R^3_y Si(OR^4)_{4-y} \quad \text{[Formula 2]}$$

wherein $R^3$ is a $C_1$ to $C_{12}$ fluoroalkyl group; $R^4$ is a $C_1$ to $C_6$ alkyl group; and y is an integer satisfying $0 \leq y \leq 3$.

2. The coating composition according to claim 1, wherein the silane compound represented by Formula 1 comprises at least one compound selected from among tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane, allyltriethoxysilane, dimethyldimethoxysilane, dimethyldiethoxysilane, diphenyldimethoxysilane, and diphenyldiethoxysilane.

3. The coating composition according to claim 1, wherein the organosilane compound represented by Formula 2 comprises at least one compound selected from among trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutyl ethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, and heptadecafluorodecyltriethoxysilane.

4. The coating composition according to claim 1, wherein x of Formula 1 is an integer of 0, 1 or 2.

5. The coating composition according to claim 1, wherein $R^3$ of Formula 2 is a $C_3$ to $C_5$ fluoroalkyl group.

6. The coating composition according to claim 1, wherein the hollow silica particles have a number average diameter from 1 nm to 1,000 nm.

7. The coating composition according to claim 1, wherein the binder is present in an amount of 10 parts by weight to 120 parts by weight based on 100 parts by weight of the hollow silica particles.

8. An anti-reflective film comprising a low index of refraction layer formed by coating the coating composition according to claim 1 onto a surface of a base.

9. The anti-reflective film according to claim 8, wherein the low index of refraction layer has an index of refraction from 1.20 to 1.25.

10. The anti-reflective film according to claim 8, wherein the low index of refraction layer has a thickness of 1 nm to 1,000 nm.

11. The anti-reflective film according to claim 8, wherein the anti-reflective film has a transmittance of 96% or more and a luminous reflectance from 0.5% to 1.0%.

12. A touch panel comprising the anti-reflective film according to claim 8.

13. A method for manufacturing an anti-reflective film, comprising:
preparing a binder by polymerization of a silane compound represented by Formula 1 and an organosilane compound represented by Formula 2,
wherein the organosilane compound represented by Formula 2 is present in an amount of 1 part by weight to 30 parts by weight, based on 100 parts by weight of the silane compound represented by Formula 1, and
wherein the binder has a weight average molecular weight from 12,000 to 18,000;
preparing a coating composition comprising surface-treated hollow silica particles by adding the binder and an acid catalyst to the hollow silica,
wherein the acid catalyst is configured to promote a surface treatment of the hollow silica particle by the binder,
wherein the acid catalyst is present in an amount of 0.1 part by weight to 20 parts by weight, based on 100 parts by weight of the hollow silica particles;
coating the coating composition onto at least one surface of a base film; and
performing heat treatment of the coated coating composition,
wherein the acid catalyst is configured to adjust the coating composition to a pH value in the range of 2 to 4

$$R^1_x Si(OR^2)_{4-x} \quad \text{[Formula 1]}$$

wherein $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \leq x \leq 3$ $$R^3_y Si(OR^4)_{4-y} \quad \text{[Formula 2]}$$

wherein $R^3$ is a $C_1$ to $C_{12}$ fluoroalkyl group; $R^4$ is a $C_1$ to $C_6$ alkyl group; and y is an integer satisfying $0 \leq y \leq 3$.

14. The method according to claim 13, wherein the coating composition comprises 10 parts by weight to 120 parts by weight of the binder, based on 100 parts by weight of the hollow silica particles.

15. The method according to claim 13, wherein the coating composition is prepared by adding the binder and the acid catalyst to the hollow silica particles, followed by stirring at 20° C. to 40° C. for 5 hours to 50 hours.

16. The method according to claim 13, wherein heat treatment is performed at a temperature of 50° C. to 200° C.

* * * * *